United States Patent [19]

Kida et al.

[11] Patent Number: 4,740,892
[45] Date of Patent: Apr. 26, 1988

[54] MICROCOMPUTER HAVING PERIPHERAL FUNCTIONS

[75] Inventors: Hiroyuki Kida; Hideo Maejima, both of Hitachi, Japan

[73] Assignee: Hitachi, Ltd., Tokyo, Japan

[21] Appl. No.: 760,180

[22] Filed: Jul. 29, 1985

[30] Foreign Application Priority Data

Jul. 27, 1984 [JP] Japan ................................ 59-158260

[51] Int. Cl.⁴ .............................................. G06F 9/22
[52] U.S. Cl. .................................................. 364/200
[58] Field of Search ......................... 364/200 MS File

[56] References Cited

U.S. PATENT DOCUMENTS

| | | | |
|---|---|---|---|
| 4,050,058 | 9/1977 | Garlic .................................... | 364/200 |
| 4,130,869 | 12/1978 | Kinoshita et al. ..................... | 364/200 |
| 4,181,938 | 1/1980 | Suzuki et al. ......................... | 364/200 |
| 4,339,793 | 7/1982 | Marenin ................................ | 364/200 |
| 4,348,720 | 9/1982 | Blahut et al. ......................... | 364/200 |

FOREIGN PATENT DOCUMENTS 0094042 11/1983 European Pat. Off. .

OTHER PUBLICATIONS

Helbig et al., "A VLSI Microcomputer: The RCA ATMAC", *Computer*, vol. 10, No. 9, Sep. 1977, pp. 22-27.

*Primary Examiner*—Raulfe B. Zache
*Attorney, Agent, or Firm*—Antonelli, Terry & Wands

[57] ABSTRACT

On a single semiconductor chip, there are provided an arithmetic logic unit, a general-purpose register for storing data to be processed and data as a result of the operation in the arithmetic logic unit, a peripheral register used for performing the peripheral functions required, a buffer register and an internal bus line through which the above mentioned components conduct the data communication with one another. Further, there is provided on the chip a microprogram storage and control device which stores microinstructions for processing instructions read out from a main memory (an instruction processing) and data processing necessary for performing the required peripheral functions (an auxiliary function processing). The microinstructions are read out successively and decoded one after another to produce control signals for controlling the arithmetic logic unit, the general-purpose register, the peripheral register and the buffer register, whereby these components are shared by the instruction processing and the auxiliary function processing.

9 Claims, 8 Drawing Sheets

MICROCOMPUTER HAVING PERIPHERAL FUNCTIONS

BACKGROUND OF THE INVENTION

1. Field of the Invention

The present invention relates to a microcomputer capable of reducing the quantity of hardware components, in which system there are provided a central processing unit performing various arithmetic operations as well as logical operations and other data processing tasks and auxiliary devices for performing various kinds of auxiliary functions. Particularly, the present invention is most advantageously applicable to the microcomputer which has components for the central processing unit and the auxiliary functions on a single semiconductor chip integratedly.

2. Description of the Related Art

In order to realize a desired computer system, a processor which executes the data processing in accordance with a user program stored in a main memory has to be combined with some of auxiliary devices which are purposively selected. As the auxiliary device in a sense here, various kinds of peripheral devices are of course included; for example, a direct memory access (DMA) controller for controlling a high-speed transfer of a large amount of data within the main memory, a refresh controller for controlling the refresh of dynamic random access memories, a timer, various kinds of interfaces and so on. Further, as is understood from the explanation described later, even a part of functions of the central processing unit can be of the auxiliary function in a certain case.

In case such a computer system is constructed by elements of a so called discrete type in which a circuit for the particular element is formed on a separate semiconductor chip, the complicated wiring of signal lines connecting the elements is necessiated and the control between the mutually related elements becomes also complicated.

Therefore, as is well known, a single chip microcomputer is proposed which has the central processing unit and some of the auxiliary devices in accordance with the necessity on the single semiconductor chip to achieve a particular function. For example, the microcomputer which has the central processing unit and the DMA controller as one of the auxiliary devices on the single semiconductor chip is taken into consideration as a conventional type of the single chip microcomputer.

According to the arrangement usually adopted in such a single chip microcomputer, two groups of devices with the structure similar to each other are formed on the single semiconductor chip, each having an arithmetic logic unit, registers, a buffer register and an internal bus line connecting them. One group functions as the central processing unit and the other as the DMA controller. The arithmetic logic unit generally has the functions of various kinds of arithmetic operations and logical operations. The arithmetic logic unit of the central processing unit uses both functions to execute the predetermined processing in accordance with instructions and data stored in the main memory, and that of the DMA controller uses the function of the arithmetic operation to conduct the operation of address referred to in the main memory and the calculation of the number of words to be transferred. There are a few cases where the function of the logical operation in the arithmetic logic unit of the DMA controller is utilized.

The registers provided in the processing unit and the DMA controller are used only for the operation of the respective arithmetic logic units, that is to say, the arithmetic logic unit of the processing unit reads out the data necessary for its operation from the registers belonging to the processing unit, and the result of the operation thereof is stored into those registers. The same is true of the relationship between the arithmetic logic unit and the registers in the DMA controller. The registers of the processing unit is referred to as a general-purpose register and those of the DMA controller as a peripheral register, hereinafter. The structure and function, however, are the same in both the registers, as described above.

Further, the buffer registers included both in the processing unit and in the DMA controller are also the same in their function and role. Namely, the buffer register is connected to an external bus line, to which the main memory is connected, for example, as well as the internal bus line. The data sent through the internal bus line are temporarily stored in the buffer register and outputted to the external bus line therefrom, and further the data transferred through the external bus line are temporarily stored in the buffer register and then taken into some other components in the processing unit through the internal bus lines.

As is described above, in case the single chip microcomputer is constructed with the processing unit and the DMA controller on the single semiconductor chip independently, microcomputer, in result, has the components of the same function in duplication, so that the quantity of the hardware components becomes larger and the occurance rate of logic failure becomes high because of the increase in the logic scale.

SUMMARY OF THE INVENTION

An object of the present invention is to provide a microcomputer capable of reducing the quantity of hardware components forming the microcomputer, which has a central processing unit and devices for auxiliary functions prepared in accordance with the necessity on a single semiconductor chip.

According to a feature of the present invention, registers which, in a conventional microcomputer, are on a semiconductor chip of a corresponding auxiliary function device are provided on the semiconductor chip of the central processing unit and connected with an internal bus line of the central processing unit. The central processing unit is controlled by a microprogram storage and control means which stores microinstructions for executing both the processing of instructions read out from a main memory (an instruction processing) and the processing of the auxiliary functions required of the microcomputer (an auxiliary function processing).

In the present invention, an arithmetic logic unit, a main component of the central processing unit, for example, conducts the processing operation on the time-sharing basis, so that it can be shared by the instruction processing and the auxiliary function processing. Other components of the central processing unit which associate the arithmetic logic unit are also used in common both for the instruction processing and for the auxiliary function processing, based upon the microprogramed control by the microprogram storage and control means. Namely, many of the hardware components of the microcomputer are shared by various processing, so that the quantity of the hardware components can be remarkably reduced.

Further, the present invention has the following effect in addition to the reduction of the quantity of the hardware. Namely, if the above mentioned registers are mapped as a part of the address space of the main memory and function as a stack of the central processing unit, it becomes possible to transfer data stored in registers of the processing unit to the stack at a high speed. Conventionally, the stack occupies a part of real locations of the main memory. Therefore, it take time to a certain extent to transfer the data to the stack. The above mentioned effect of the present invention is very useful in such a case where the data under execution within the processing unit have to be temporarily saved into the stack in order to receive an interrupt demand from the external resources and to shift the operation from the instruction processing to the interrupt processing. The same is applicable to a subroutine processing. Namely, when the subroutine is called during the execution of a main routine and it becomes necessary to temporarily save the data to the stack in order to execute the subroutine, the saving of the data can be performed very quickly.

BRIEF DESCRIPTION OF THE DRAWINGS

FIGS. 3A, 3B, 3C, 4, 5, 6A, and 6B are drawings for explaining the operation of the embodiment of FIG. 1, in which FIG. 4 shows a sequence diagram of processing the instructions shown in FIG. 3, FIG. 5 is a flow chart representing the flow of the instruction processing and FIGS. 6(A) and (B) are flow charts showing the refresh data processing and the DMA data processing, respectively;

FIGS. 9 and 10 are drawings for explaining the operation of an arithmetic logic unit used in the embodiment of FIG. 1, in which FIG. 9 shows the interconnection of the arithmetic logic unit and registers and FIG. 10 is a sequence diagram representing the operation of the arithmetic logic unit and the associated components.

DESCRIPTION OF THE PREFERRED EMBODIMENTS

The explanation will be made of the microcomputer according to an embodiment of the present invention, with reference to the accompanying drawings.

Figure 1:
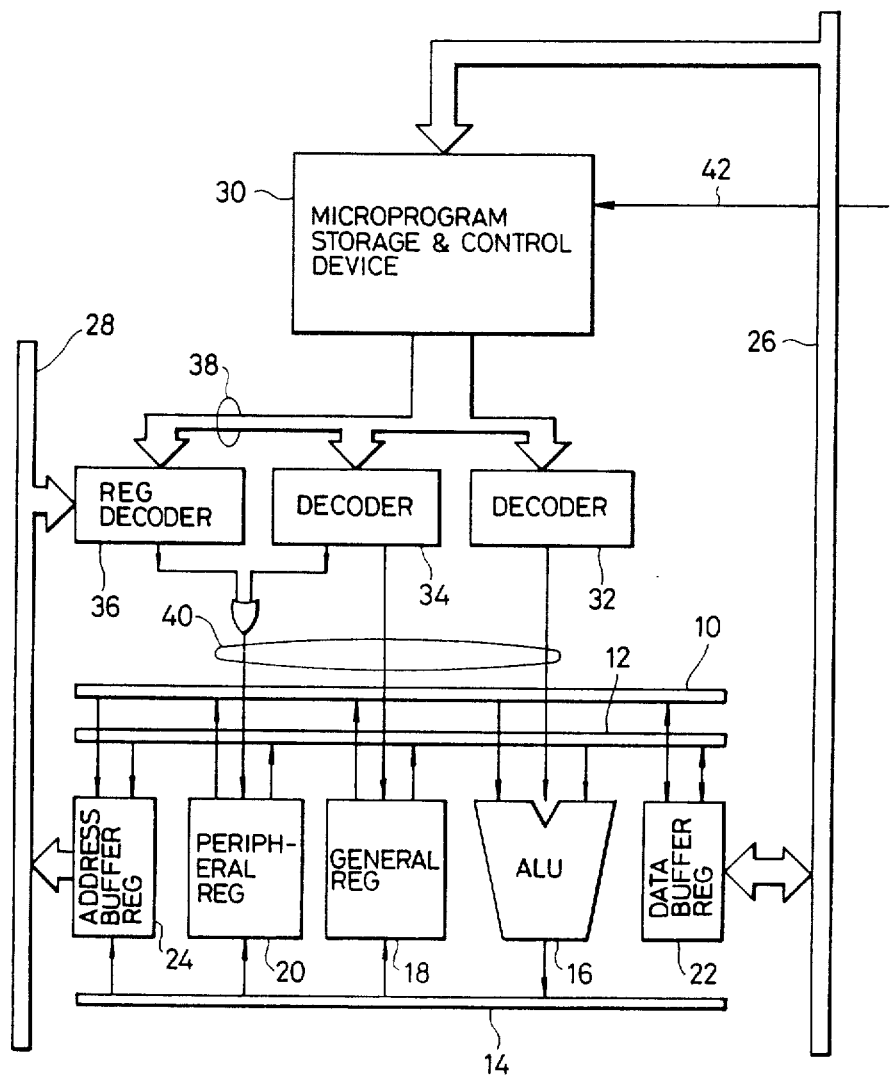
FIG. 1 is a schematic diagram showing a microcomputer according to an embodiment of the present invention.

Referring at first to FIG. 1, an internal bus line composed of three buses, i.e., X bus 10, Y bus 12 and Z bus 14, is provided on a semiconductor chip. On the same chip are provided an arithmetic logic unit 16 (referred to as ALU, hereinafter) which executes the predetermined operation in accordance with instructions and data transferred from a main memory or supplied by an input/output device, a group of registers 18 functioning as a general-purpose register storing data to be processed and data as a result of the operation in the ALU 16, another group of registers 20 prepared for peripheral functions. Here, various kinds of devices are considered as a device performing the peripheral function; i.e., the DMA controller, the memory refresh controller, the timer, as already described before, and, besides, a data transmitter, a serial/parallel data converter etc.. In almost all of those peripheral devices, however, there are provided various registers. For example, the DMA controller has the registers holding a source address of data to be transferred and a refresh destination address thereof. The refresh controller has a register storing an address of data to be refreshed. The group of registers 20 mean those registers which are included in the peripheral devices and used for performing the peripheral functions assigned thereto. Further a pair of buffer registers are provided on the semiconductor chip, one of which functions as a data buffer register 22 and the other as an address buffer register 24.

The ALU 16 gets data from the internal X, Y buses 10, 12 and outputs the result of its operation onto the internal Z bus 14. The general-purpose register 18 and the peripheral register 20 output data stored therein onto the X, Y buses 10, 12 and take data as the result of the operation in the ALU 16 through the Z bus 14 to store them therein. The buffer register 22 is connected with an external data bus 26 as well as the internal X, Y buses 10, 12 to temporarily store data transferred between both the internal and the external buses 10, 12 and 26. The external data bus 26 forms an external bus line together with an external address bus 28. The external bus line is not provided within the same chip, but is formed outside the chip, and various kinds of external resources are connected therewith. The main memory is one of them. The address buffer register 24 is supplied with data as an address information through the three internal buses 10, 12, 14 and outputs data temporarily stored therein onto the external address bus 28.

Here, the reason why the internal bus line is composed of the three buses 10, 12, 14 is as follows. For example, the peripheral register 20 can get data as the result of the operation in the ALU 16 through the Z bus 14, even during the X, Y buses are occupied by the data transfer between the general-purpose register 18 and the data buffer register 22. Namely, two data transfers can be done in parallel simultaneously. If there is not the Z bus 14, the data transfer between the ALU 16 and the peripheral register 20 has to wait until the X, Y buses 10, 12 become free. In this case, the data transfers become serial. Therefore, the data transfer can be conducted more speedily by providing the Z bus 14. The fact that there are provided three internal buses, however, has nothing to do with the essence of the present invention. The present invention, therefore, is never limited by the above mentioned fact.

On the semiconductor chip, devices which control the arrangement described above are also provided. Those devices are composed of a microprogram storage and control device 30 and a group of decoders 32, 34 and 36. Particulars of the microprogram storage and control device 30 and the decoders 32, 34, 36 will be described later, referring to related drawings. Briefly speaking here, the functions of these devices are as follows.

The microprogram storage and control device 30 receives the instructions from the main memory through the external data bus 26. Every time the instruction is received, microinstructions necessary for completing the execution of the received instruction are read out from among those stored in the microprogram storage and control device 30. The decoders 32, 34, 36 decode the read-out microinstructions 38 to produce control signals 40 which control the above mentioned components, i.e., the ALU 16, the general-purpose register 18, the peripheral register 20 and the buffer registers 22 and 24.

Further, an external signal is applied to the microprogram storage and control device 30 through a line 42. The signal 42 can be an interrupt signal which is given from the external resources, for example, the signal for demanding the initiation of the peripheral functions which are incorporated into the microcomputer, such as the DMA control function, the memory refresh function and so on.

Figure 2:
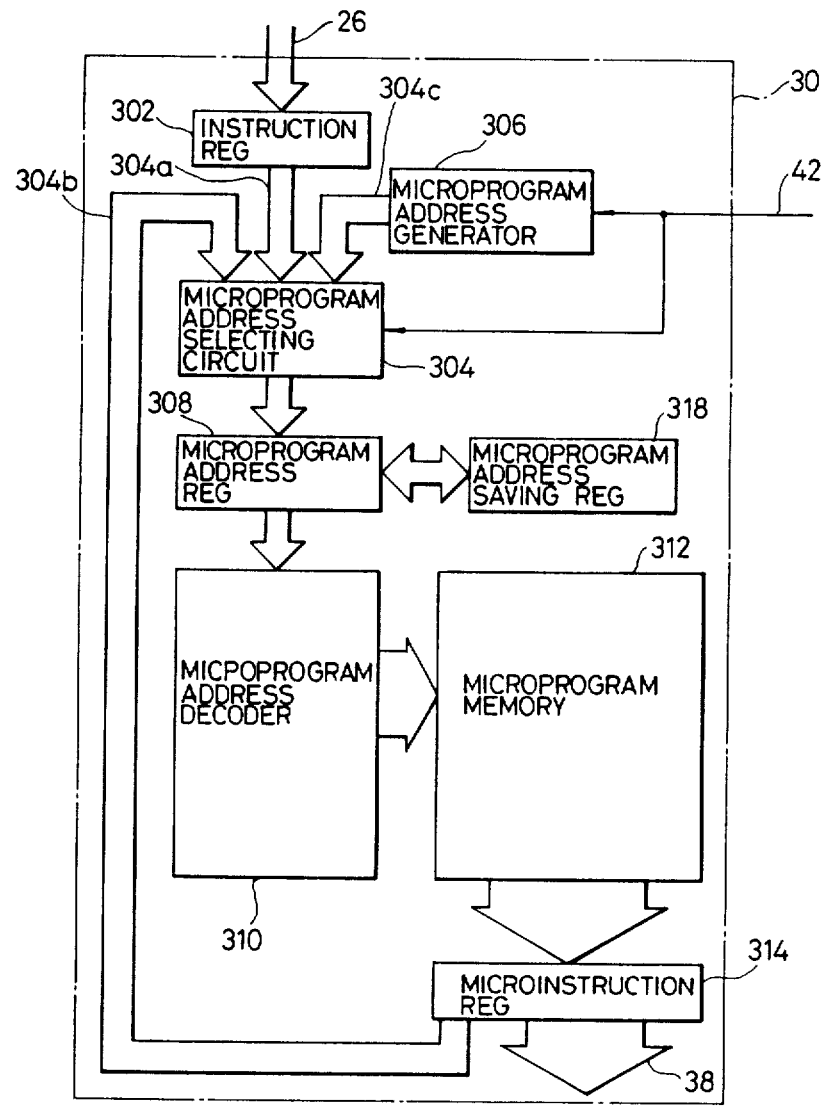
FIG. 2 shows a construction of a microprogram storage and control device used in the embodiment shown in FIG. 1.

Next, referring to FIG. 2, the details of the microprogram storage and control device 30 will be explained. In the figure, at first, the instruction which is read into the microprogram storage and control device 30 through the external data bus 26 from the main memory is stored in an instruction register 302. A microprogram address selecting circuit 304 selects one of three input signals 304a, 304b and 304c applied thereto. In a usual condition, the input signal 304a, i.e., the instruction stored in the register 302, is selected. Upon receipt of the external signal 42, the address selecting circuit 304 selects the input signal 304c which is produced in a microprogram address generator 306 described in detail later. Further, a case where the input signal 304b is selected will be explained in connection with the description of the operation about the microprogram later.

The instruction selected by the address selecting circuit 304 is stored in a microprogram address register 308. The instruction stored in this register 308 holds an address information of the microprogram necessary for executing the instruction. The address information of the microprogram is led to a microprogram address decoder 310, in which the address information is decoded into the address of a microprogram memory 312. In the location of the decoded address within the microprogram memory 312, the predetermined microprogram necessary for executing the instruction is stored in the form of a series of microinstructions. In contrast to the microinstruction, the instruction read out from the main memory is called a macroinstruction for a clear distinction from each other, hereinafter.

The microinstruction read out from the microprogram memory 312 is temporarily latched by a microinstruction register 314 and led to the decoders 32, 34 and 36, as already stated before. Usually, the individual microinstruction holds, in a part thereof, an address information of the next microinstruction to be read out. The address information of the microinstruction latched by the register 314 is fed back to the address selecting circuit 304 as the input signal 304b. When the input signal 304b is supplied to the address selecting circuit 304, the selecting circuit 304 selects the input signal 304b, i.e., the address information of the next microinstruction to be read out.

The address information thus read into the address selecting circuit 304 is sent through the address register 308 to the address decoder 310, in which it is decoded into the address within the memory 312. The next microinstruction is read out based upon the decoded address.

In this manner, a series of the microinstructions necessary for executing the macroinstruction are read out successively, and the read-out microinstructions are sent to the decoders 32, 34 and 36 through the register 314 one after another. The decoders 32, 34 and 36 decode the microinstruction to generate the control signals 40, which control the ALU 16 and other necessary components. When the control based upon a set of the microinstructions is completed, the execution of the macroinstruction becomes accomplished, i.e., the instruction processing for one macroinstruction is completed.

If the external signal 42, e.g., the demand for processing data for the DMA control function, the memory refresh function and so on, is applied to the microprogram storage and control device 30 during the instruction processing as stated above, the signal 42 is received by the microprogram address generator 306, in which the address information of the microprogram necessary for processing the demand is generated. The address selecting circuit 304 memorizes the receipt of the external signal 42 and selects the input signal 304c after the completion of the predetermined execution (which is described later in conjunction with the explanation of the operation). The address information of the microprogram for processing the external demand is led to the address decoder 310 through the address register 308. In this case, a microprogram address saving register 318 temporarily saves the content existing in the address register 308 at that time.

In the address decoder 310, the address information applied by the address generator 306 is decoded to that address within the memory 312, in the location of which the entry of a series of the microinstructions necessary for processing the demand is stored. The operation following thereto is the same as that for the execution of the macroinstruction as already mentioned above. After the completion of the processing of the demand, the address information temporarily saved in the saving register 318 is returned to the address register 308, so that the execution of the microinstructions corresponding to the macroinstruction is started again.

Referring now to FIGS. 3 to 6, the course of processing the instruction and the external demand will be explained hereinafter.

Figure 3:
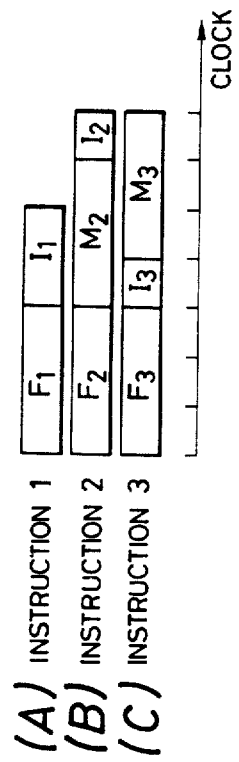
FIG. 3 shows examples of instructions to be processed.

Three types of the instructions are shown in FIG. 3 as examples. In the figure, however, each instruction is illustrated not in the form of a structure of the instruction, but with respect to a cycle of a clock pulse necessiated for the execution of the instruction. Namely, the instruction 1 shown in FIG. 3 (A) requires three cycles ($F_1$) for fetching the instruction to the processing unit composed of the ALU and other necessary components from the main memory and two cycles ($I_1$) for implementation of the fetched instruction within the processing unit. Therefore, total five cycles are necessary for completing the execution of the instruction 1. The instruction of this type is used, in a case where objects of the operation are only in the processing unit; for example, the case where two data within the general-purpose register are added and the result of the operation is stored in the general-purpose register again. In the instruction 2 as shown in FIG. 3(B), three cycles ($F_2$) for the instruction fetch, three cycles ($M_2$) for the access to the main memory and one cycle ($I_2$) for implementing the instruction within the processing unit are required. The instruction of the second type is used, for example, in a case where the data read from the main memory and the data stored in the general-purpose register are added and the result thereof is stored in the general-purpose register, or where the data read from the main memory is transferred to the general-purpose register.

Similarly, the instruction 3 shown in FIG. 3(C) requires three cycles ($F_3$) for the instruction fetch, one cycle ($I_3$) for implementation of the instruction within the processing unit and three cycles ($M_3$) for the memory access. The instruction of the third type is used, for example, in a case where the certain data of the general-purpose register is transferred to the main memory.

Figure 4:
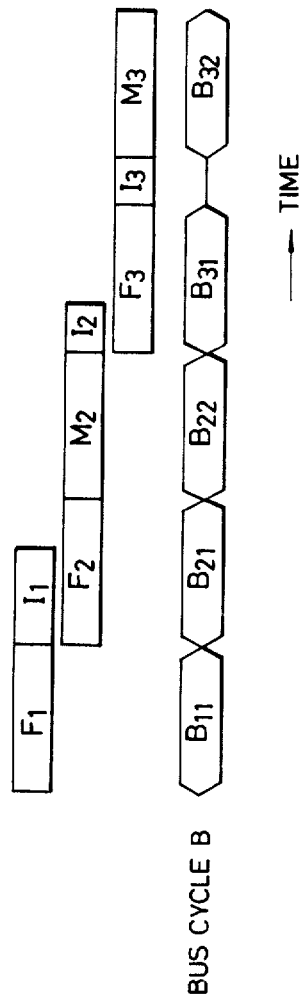

In this way, with respect to the completion of the execution, the time necessary for each cycle, i.e., the instruction fetch cycle (F), the internal implimentation cycle (I) or the memory access cycle (M) is not the same in every instructions and different in accordance with the processing content of the instruction. When such instructions are processed, the pipe-line processing is usually adopted. FIG. 4 shows the relation between the execution of the instruction and the occupation of the bus line, when the instructions as indicated in FIGS. 3(A) to (C) are executed by the pipe-line processing. As shown in the bus cycles $B_{11}$ and $B_{21}$, the bus line which is occupied during the fetch cycle ($F_1$) of the instruction 1 is released, when the execution of the instruction 1 enters into the implimentation cycle ($I_1$). When the bus line is released from the occupation by the fetch cycle ($F_1$), the fetch cycle ($F_2$) of the instruction 2 is initiated and the bus line becomes the bus cycle $B_{21}$. The fetch of the instruction 2 in such a manner as described above is called a prefetch. Further, in the bus cycle $B_{22}$, since the bus line is busy for the memory access cycle ($M_2$), it can not be shared to the execution of any other instructions. Therefore, even if the fetch of the instruction 3 is triggered in the bus cycle $B_{22}$, the initiation of the fetch cycle ($F_3$) has to wait until the completion of the bus cycle $B_{22}$.

Figure 5:
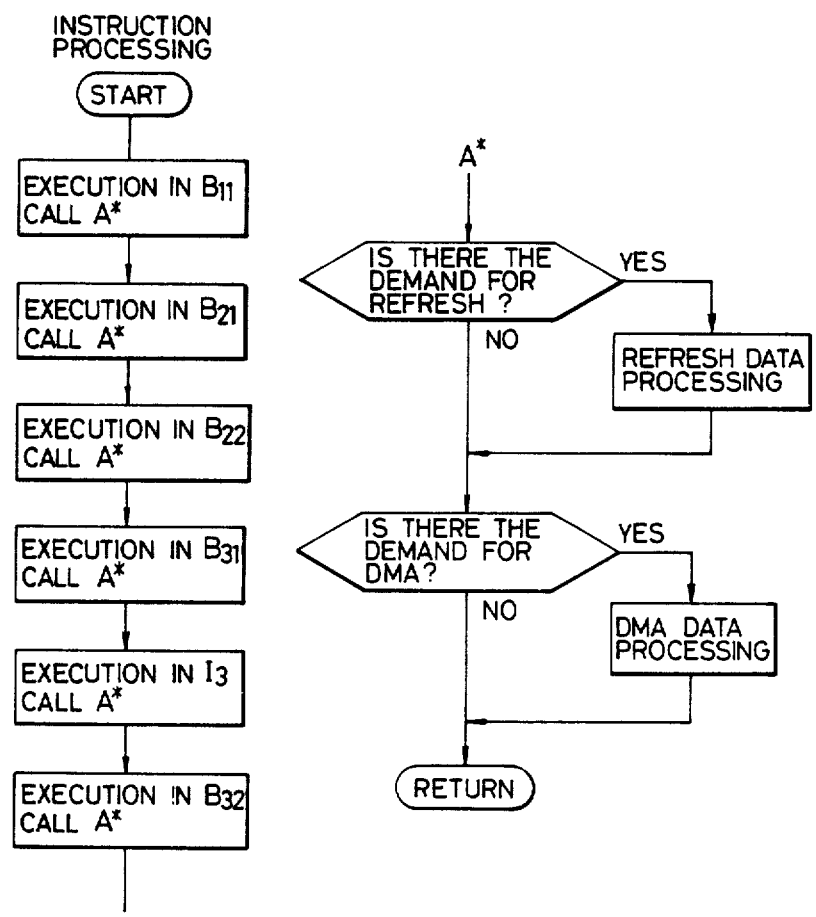
Figure 6:
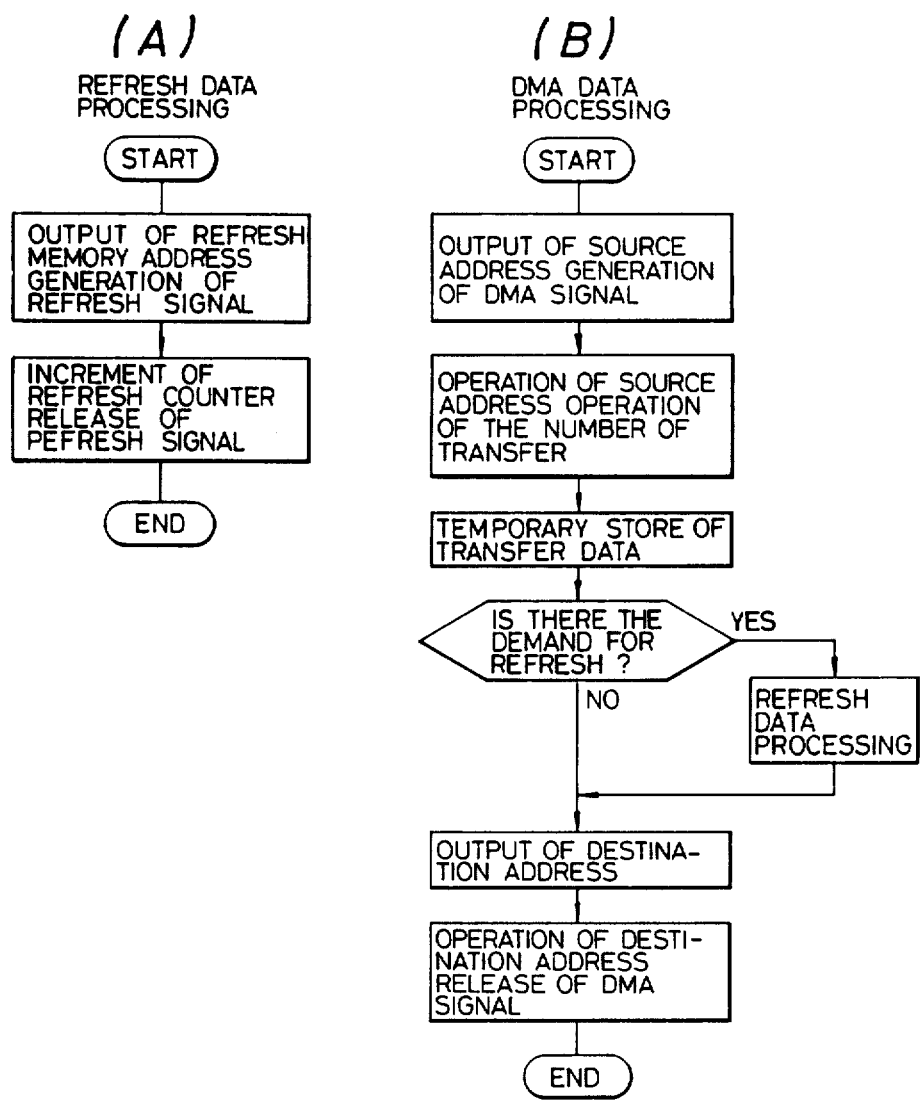

Next, the description will be made of the execution procedure of the instruction processing in a case where the instructions 1, 2 and 3 shown in FIGS. 3(A) to (C) are executed successively. In FIG. 5, when the instruction processing starts, the execution of the instruction 1 in the bus cycle $B_{11}$ is initiated, i.e. the fetch cycle of the instruction 1 as shown in FIG. 4. Simultaneously therewith, the routine as shown in the right-hand side of FIG. 5 is called, and the existence of the demands for the memory refresh function and the DMA control function is judged by the execution of this routine. If there are no demands, the fetch of the instruction 1 is conducted through the bus cycle $B_{11}$. After the completion of the instruction fetch, the execution of the fetched instruction 1 is initiated in the bus cycle $B_{21}$. Further, upon the completion of the fetch cycle of the instruction 1, the right to use the bus line is transferred for the prefetch of the instruction 2. If the demand occurs in the bus cycle $B_{11}$, the fetch of the instruction 1 is continued to be completed during the bus cycle $B_{11}$. Namely, a series of the microinstructions for performing the macroinstruction for fetching the instruction 1 is contenued to be executed until the execution of the last one of the series of the microinstructions is completed. During that, the right to use the bus line is held by the instruction 1. The last one of the microinstructions can be judged by the information the microinstruction itself holds. But, in contrast with a case of no existence of the demand, the bus cycle $B_{21}$ is not assigned to the fetch cycle of the instruction 2, but to the processing of the demand, so that the memory refresh function or the DMA control function is processed in accordance with the execution procedure whose flow is shown in FIGS. 6(A) and (B), respectively. Well, the processing of the fetched instruction 1 is executed within the bus cycle $B_{21}$, as shown in FIG. 4.

As is described above, the demand for the data processing for the peripheral functions such as the memory refresh control, the DMA control and so on is monitored every bus cycles B (including the implimentation cycle, such as $I_3$ in FIG. 4, in case the bus line is not shared to the execution of any instruction).

If the demand for any peripheral function exists, the data processing for the demand interrupts the processing of the instruction. Further, the data processing for such peripheral functions is conducted by a series of the microinstructions stored in the microprogram memory 312, in the same manner that the processing of the instruction read from the main memory is executed by a series of microinstructions, which are also stored in the memory 312. Namely, both in the processing of the instruction and in the data processing for the peripheral functions, the microinstructions read from the microprogram memory 312 successively are decoded in the decoders 32, 34 and 36 one after another, and the ALU 16, the general-pruposed and the peripheral registers 18 and 20 and the buffer registers 22, 24 are controlled by the decoded control signals 40. Among the above mentioned components forming the processing unit, only the peripheral register 20 for the peripheral functions is provided for its exclusive use. The remaining components are used in common for the purpose of both the processing of the instructions read from the main memory (the instruction processing) and the data processing for the peripheral functions (the auxiliary function processing). However, the execution of the microinstructins read out successively as mentioned above results in that the remaining components including the ALU 16 are utilized in common on the time-sharing basis for both the purposes. This fact is caused quite automatically only by executing the read-out microinstructions and has no use of particular controls or apparatuses for the time-sharing operation.

Those which are used in common among devices or components shown in FIG. 1 will be explained, hereinafter. First of all, the description is made of the decoders 32, 34 and 36. The structure of these decoders 32, 34 and 36 is almost the same in view of the fact that the decoders are essentially constructed by gate circuits, and there is a difference only in the wiring among the gate signals. But, it is easy for a person having ordinary skill in the art to wire the signal lines among the gate circuits in accordance with the required logic. Therefore, the decoder 34 which furnishes the control signal 40 for the registers 18, 20, 22, 24 is taken as an example in the following description.

Figure 7:
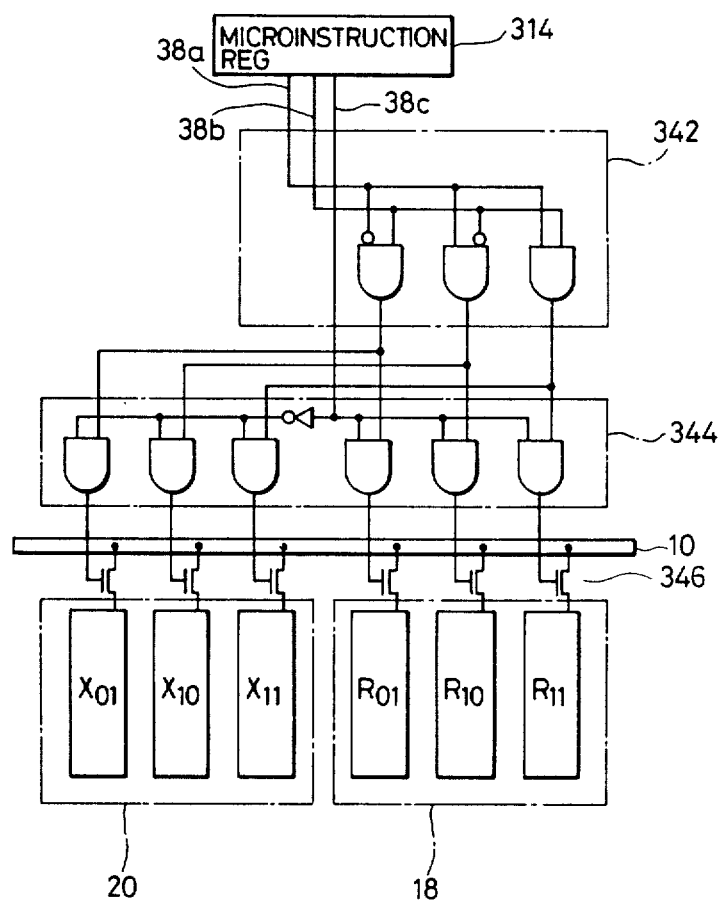
FIG. 7 is a schematic diagram showing an example of a decoder used in the embodiment of FIG. 1.

FIG. 7 shows a schematic diagram of the decoder 34. For easy understanding of the operation and function of the decoder, this figure showns a simple example in which both the general-purpose register 18 and the peripheral register 20 are composed of three individual registers, respectively; i.e., $R_{01}$, $R_{10}$, $R_{11}$ as the general-purpose register 18 and $X_{01}$, $X_{10}$, $X_{11}$ as the peripheral register 20. The decoder 34 includes two groups of gate circuits 342 and 344 and a group of semiconductor switches 346. The microinstruction register 314 provides signals 38a, 38b and 38c to the decoder 34. These signals are taken from the specific field of the microinstruction latched in the register 314 which holds the information concerning the control of the registers 18 and 20. The group of gate circuit 342 selects one of three registers $R_{01}$, $R_{10}$, $R_{11}$, belonging to the general-purpose register 18 or one of those $X_{01}$, $X_{10}$, $X_{11}$ belonging to the peripheral register 20, on a basis of the logical combination of the signals 38a and 38b. The signal 38c is a signal for selecting either the general-purpose register 18 or the peripheral register 20. In accordance with the combination of the output signal of the gate circuit group 342 and the signal 38c, one of the gates in the gate circuit group 344 produces an output signal, which drives the corresponding one of the semiconductor switches 346 to render it conductive.

In this manner, one of the registers $R_{01}$, $R_{10}$, $R_{11}$ and $X_{01}$, $X_{10}$, $X_{11}$ is selected in response to the signals 38a, 38b, 38c from the register 314, and the selected one has the communication with other components through the internal bus 10. Here, only the X bus 10 is indicated, however it is possible to accomplish the gating measures for connecting the registers with the Y bus 12 and the Z bus 14 in the same manner as described above. Further, although FIG. 7 shows the decoder formed by random gates, it can be also constructed in the form of unifying the two gate circuit groups 342 and 344 by using a regular logic such as a programable logic array (PLA).

Figure 8:
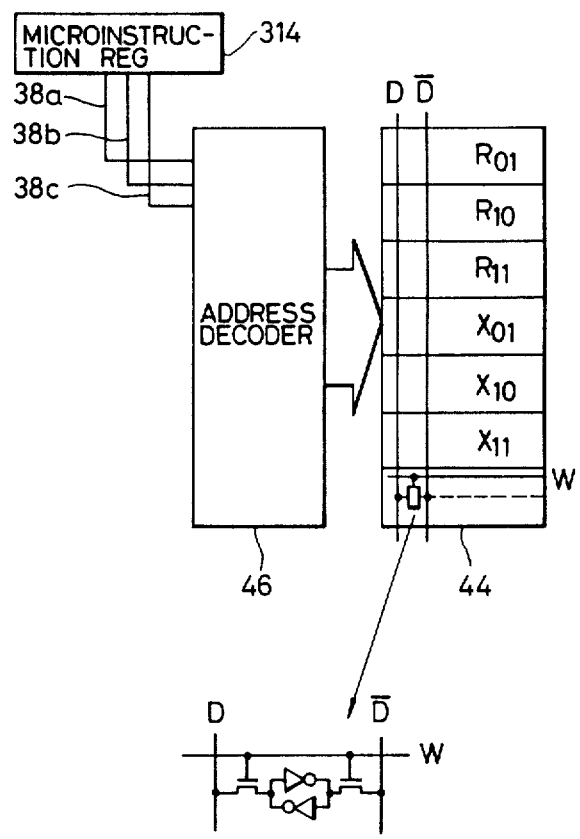
FIG. 8 is a schematic diagram showing another example of the decoder.

Moreover, a random access memory (RAM) can be used as the general-purpose register 18 and the peripheral register 20 in place of the individual registers shown in FIG. 7. FIG. 8 shows an example in which the RAM 44 is used. Address are assigned to appropriate locations of the RAM 44 in correspondence to the registers $R_{01}$, $R_{10}$, $R_{11}$ and $X_{01}$, $X_{10}$, $X_{11}$ shown in FIG. 7. In order to access the required location within the RAM 44, there is provided an address decoder 46 which furnishes the access signal by decoding the signals 38a, 38b, 38c from the microinstruction register 314.

Further, according to one of features of the present invention, the ALU is also shared by the instruction processing and the auxiliary or peripheral function processing. As already stated before, the operations for executing the data processing for the peripheral functions, such as the DMA control and the memory refresh control, are generally formed with simple arithmetic operations, all of which can be contained in the arithmetic logic operations necessary for executing the instructions read from the main memory. In this respect, it becomes possible to use only one ALU in common by having it execute the various kinds of operations on the time-sharing basis.

Figure 9:
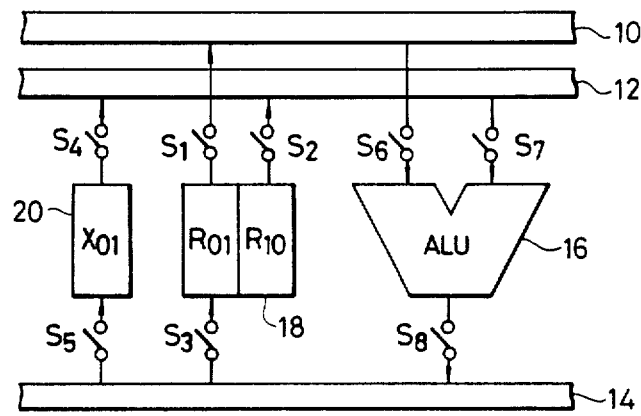
Figure 10:
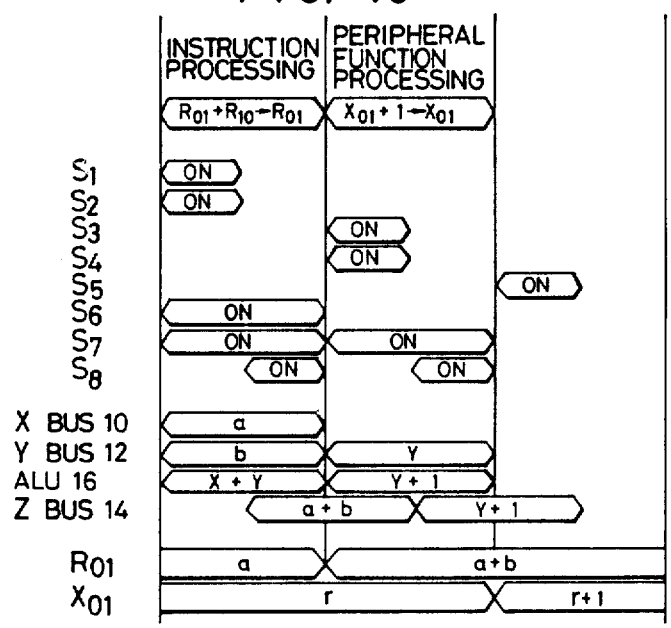

In a case of the embodiment, any particular control to execute the operations on the time-sharing basis is not needed, because the ALU 16 is automatically controlled on the time-sharing basis by executing the microinstructions read out from the microprogram storage and control device 30 successively. FIGS. 9 and 10 are the drawings for the purpose of explaining the above mentioned operation of the ALU 16. For clear understanding, a simple example is presented here, in which only the registers $R_{01}$ and $R_{10}$ of the general-purpose register 18 and the register $X_{01}$ of the peripheral register 20 are associated with the operation of the ALU 16. Namely, the registers $R_{01}$ and $R_{10}$ are connected with the X bus 10 and the Y bus 12 through switches $S_1$ and $S_2$, respectively. The register $X_{01}$ is connected with the Y bus 12 through a switch $S_4$. Further, the register $R_{01}$ and $X_{01}$ are both connected with the Z bus 14 through switches $S_3$ and $S_5$, respectively. The ALU 16 is connected with the X, Y and Z buses 10, 12 and 14 through switches $S_6$, $S_7$ and $S_8$, respectively. These switches are formed as a semiconductor switch.

Here, assuming the following situation, that is to say, the content (a) of the register $R_{01}$ is added to the content (b) of the register $R_{10}$ and the result of the addition (a+b) is stored into the register $R_{01}$, and following to that, the content (r) of the register $X_{01}$ is increased by one and the result (r+1) is stored into the register $X_{01}$ again. The operation thereof is explained, referring to FIG. 10. When the switches $S_1$ and $S_2$ are closed, the X bus 10 and the Y bus 12 are driven. Generally, once the bus is driven at a certain level, it is kept at the certain level until the bus is driven at the next time. Therefore, the buses 10 and 12 hold the contents (a) and (b) of the registers $R_{01}$ and $R_{10}$, respectively. The switches $S_6$ and $S_7$ are closed over the duration of the processing cycle of the ALU 16 so that the data on the buses 10 and 12 can be taken into the ALU 16 without any delay when the buses 10 and 12 are driven. Therefore, the ALU takes the data (a) and (b) thereinto and conducts the addition of the data (a) and (b) immediately. As a result, the Z bus 14 is driven by closure of the switch $S_8$ to keep the result of the operation (a+b). After the drive of the Z bus 14, the switch $S_8$ is opend at the end of this cycle, however the Z bus 14 continues to hold the value (a+b).

In the next cycle, the switch $S_3$ is closed, so that the register $R_{01}$ takes the data on the Z bus 14, i.e., the value (a+b), thereinto. Also in this cycle, the content (r) of the register $X_{01}$ is sent out to the ALU 16 by closure of the switch $S_4$, and the ALU 16 takes the data (r) on the Y bus 12 thereinto by closure of the switch $S_7$. In the ALU 16, the operation of adding one to (r) is conducted and the result (r+1) is sent onto the Z bus 14. This data (r+1) is taken into the register $X_{01}$ by closure of the switch $S_5$ in the further succeeding cycle.

By the way, the switches $S_1$ to $S_5$ correspond to some of the group of the semiconductor switches 346 shown in FIG. 7, which are controlled by the control signals from the decoder 34, as stated before in connection whith FIG. 7. On the other hand, the switches $S_6$ to $S_8$ are controlled by the control signals outputted by the decoder 32 (cf. FIG. 1). Therefore, the decoder 32 can be constructed by wiring gate circuits in accordance with the sequence as shown in FIG. 10.

Although we have herein shown and described only one form of the microcomputer embodying our invention, all matter contained in the above description or shown in the accompanying drawings shall be interpreted in an illustrative and not in a limiting sense. It should be understood that various changes and modifications may be made therein within the scope of the appended claims without departing from the spirit and scope of our invention.

We claim:

1. A microcomputer having an arithmetic logic unit for sequentially executing a processing of instructions read out successively from a main memory, a first group of registers connected to the arithmetic logic unit for storing data to be processed by the arithmetic logic unit and data representing a result of a processing operation thereof, a buffer register connected between the microcomputer and external resources including the main memory for buffering data, and an internal bus line connected to the arithmetic logic unit, the first group of registers and the buffer register characterized in that a second group of registers for use in processing of required auxiliary functions are connected with said internal bus line and a microprogram storage and control means is connected to receive and store microinstructions both for instruction processing and for processing of required auxiliary functions and is connected to control the arithmetic logic unit, the first and the second groups of registers and the buffer register, whereby the arithmetic logic unit, the buffer register and the internal bus line are shared by instruction processing and processing of required auxiliary functions by executing microinstructions read out from the microprogram storage and control means successively.

2. A microcomputer as defined in claim 1, wherein an auxiliary function to be processed is a direct memory access control and said second group of registers is used for storing a source address and a destination address of data to be transferred.

3. A microcomputer as defined in claim 1, wherein an auxiliary function to be processed is a dynamic memory refresh control and said second group of registers is used for storing an address of data to be refreshed.

4. A microcomputer as defined in claim 1, wherein addresses as a part of an address space of the main memory are allocated to said second group of registers, whereby said second group of registers function as a stack for temporarily saving data stored in said first group of registers when an interrupt of a then executed processing is requested from external resources.

5. A microcomputer as defined in claims 1, 2, 3 or 4, wherein both said first and said second groups of registers are allocated on a single random access memory, to which addresses of each register group are assigned.

6. A microcomputer as defined in claim 2, wherein the direct memory access control is operated in response to a request signal received from external resources.

7. A microprogram storage and control device for a microcomputer having an arithmetic logic unit, which executes processing of instructions read out from a main memory and processing for auxiliary functions required by external resources including the main memory, and internal resources coupled with the arithmetic logic unit and used in common for execution for both the processing of instructions and the processing for auxiliary functions, comprising:

memory means for storing microinstructions for both processing of instructions and processing of auxiliary functions;

means for generating a microprogram address of a location in said memory means, in which location an entry one of a series of the microinstructions necessary for executing a processing of an auxiliary function required by the external resources is stored;

means connected to said memory means, said microprogram address generating means and said main memory for selecting one address from among a microprogram address determined by an instruction read out from the main memory, a microprogram address generated by said microprogram address generating means and a microprogram address determined by a microinstruction read out from said memory means last;

means connected to said microprogram address selecting means for decoding a microprogram address selected by said microprogram address selecting means and for reading out a microinstruction stored in a location of said memory means designated by a decoded microprogram address; and means connected to receive a microinstruction read-out from said memory means for producing signals for controlling the arithmetic logic unit and the internal resources by decoding the read-out microinstruction.

8. A microprogram storage and control device as defined in claim 7, further including microprogram address register means for storing the microprogram address selected by said microprogram address selecting means for effecting decoding thereof and microprogram address saving register means for temporarily saving a microprogram address stored in said microprogram address register means when a request for processing of auxiliary functions occurs.

9. A microprogram storage and control device as defined in claim 7, wherein an auxiliary function to be processed is a direct memory access control and said microprogram address generating means is operated in response to a request signal received from external resources.

* * * * *